United States Patent Office

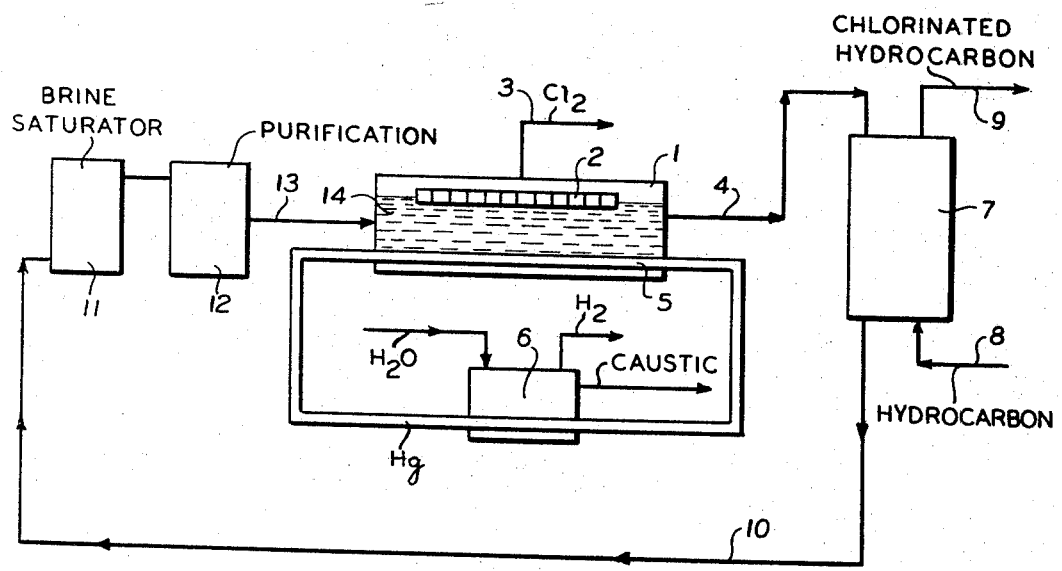

3,415,727
Patented Dec. 10, 1968

3,415,727
PROCESS FOR THE PURIFICATION OF SALT-DEPLETED SOLUTIONS OF THE ALKALI METAL CHLORIDE ELECTROLYSIS EMPLOYING A MERCURY CATHODE
Karl Hass, Niederkassel, and Rudolf Cordes, Ranzel, Germany, assignors to Dynamit Nobel Aktiengesellschaft, Troisdorf, Bezisk Cologne, Germany, a corporation of Germany
Filed Oct. 15, 1965, Ser. No. 502,757
Claims priority, application Germany, Oct. 31, 1964, D 45,758
9 Claims. (Cl. 204—128)

In the production of chlorine by electrolysis of aqueous alkali chloride solutions according to the mercury process, the salt-depleted brine always contains considerable amounts of dissolved chlorine. These amounts increase with decreasing salt content and decreasing temperature. When potassium chloride solutions are used in this process, the dissolved chlorine content is about three times as high as in the case of sodium chloride solutions. This chlorine must be removed since it interferes with the subsequent operation stages.

The bulk of the dissolved chlorine is, as a rule, recovered by vacuum distillation. The remaining portion can be removed by blowing with air or by reduction of the chlorine with bisulfite or other reducing agents. In the case of the most frequently used bisulfite, there occur additional costs for the removal of the sulfate formed by means of barium chloride or barium carbonate. When air is used it must be subsequently freed of chlorine by scrubbing. In potassium chloride solutions, blowing with air cannot remove chlorine completely.

The present invention relates to a process for the purification of salt-depleted brines of the alkali chloride electrolysis according to the mercury process. According to the invention, the salt solutions, if desired after a partial chlorine removal by vacuum distillation, may be treated with liquid or gaseous hydrocarbons at temperatures between about 50 and about 100° C. Hydrocarbons applied according to the present invention include aromatic hydrocarbons such as, for example, benzene, and alkyl substituted aromatic hydrocarbons, particularly mononuclear derivatives, such as, for example, toluene; saturated aliphatic hydrocarbons such as, for example, methane, ethane, propane, butane; and especially unsaturated aliphatic hydrocarbons such as, e.g., ethylene, propylene or acetylene, including polyolefins as well as monoolefins. Instead of the pure hydrocarbons, also mixtures of these hydrocarbons or residual gases which still contain portions of these hydrocarbons can be used. The hydrocarbon can contain up to 10 carbon atoms.

Broadly considered, this invention involves the electrolysis of alkali metal chloride brine solution employing a mercury cathode to provide chlorine and an alkali metal amalgam, wherein a solution depleted in alkali metal amalgam and containing dissolved chlorine is produced, and the removing of chlorine from the depleted solution by contacting it with a hydrocarbon compound gas or liquid. Preferably the hydrocarbon is a gaseous hydrocarbon, i.e., is a gas at room temperature and atmospheric pressure.

The principal advantage of the process according to the present invention is the fact that large quantities of chlorine containing alkali metal chloride solutions can be dechlorinated with small amounts of gas within a short time of contact. Thus a complete removal of chlorine can be achieved, when unsaturated hydrocarbons are used, at residence or contacting times of for example less than 2 minutes, commonly less than 1 minute, in the reaction space; said hydrocarbons being practically completely reacted during this period of time. When saturated hydrocarbons are used, an excess must be applied at short residence time in order to remove substantially all the chlorine. The residence time varies with the hydrocarbon used and with the chlorine content of the medium treated. Another advantage is the easy control of the reaction, since an excess of these hydrocarbons escapes in unreacted form and, therefore, no excess of reducing agent can remain in the alkali chloride solution. At the same time, a part of the hydrocarbon is consumed by reduction of the alkali chlorate which is always present in technical electrolyte solutions. This reduction is based on the following fact: In hydrochloric acid solution, when chlorine is gradually depleted, chlorine is always regenerated to a greater extent by reaction of chlorate with hydrochloric acid until this reaction is interrupted by alkalinization with lyes, which in conventional practice, is effected before or after the saturation with brine. A part of the hydrochloric acid consumed is regenerated again and again by the reaction of the hydrocarbons with chlorine.

By means of the process according to the invention, it is possible to remove chlorine completely by introducing hydrocarbons into the system. Since, however, technical electrolyte solutions contain always mercury salts, it is advisable to leave a small portion of chlorine in the brine in order to guarantee that none of the highly volatile mercury I chloride (mercurous chloride) is formed.

The chlorinated hydrocarbons produced during the reaction between chlorine and the hydrocarbons and, after the reaction, dissolved in the alkali metal chloride solution, in the order of magnitude of 50 mg. per liter, are removed almost completely along with the evaporating water during concentration of the solution in the salt bin. The remaining portion of less than 10 mg. per liter does not interfere, as by reducing purity of the chlorine produced or damaging rubberized apparatus.

EXAMPLE 1

A 25% potassium chloride solution with a chlorine content of 0.06 to 0.07 gram per liter and at a temperature of 70 to 72° C. is continuously fed into an unpacked tower (cross-sectional area 0.8 m.$^2$) at the top. Ethylene is blown in through a nozzle at the bottom of the tower. With a quantity of brine of 200 m.$^3$ per hour and a residence time of the brine in the reaction tower of 45 seconds, the following chlorine contents are obtained in the discharged brine when different amounts of ethylene are used.

| Ethylene consumption in kg./hr. | Chlorine content, alkalinization in g./liter | |
|---|---|---|
| | Before | After |
| 9.8 | 0.010–0.014 | 0–0.007 |
| 6.7 | 0.010–0.017 | 0–0.007 |
| 5.6 | 0.014–0.017 | 0–0.007 |
| 3.9 | 0.017–0.021 | 0.003–0.01 |

Thus 3.9 kg./hr. serve to remove chlorine to a suitable extent. The process can be operated so that substantially all of the ethylene introduced is absorbed and a recycle stream is not necessary.

After the reaction with ethylene, the following substances are found in the potassium chloride solution: 2 to 5 mg./l. of dichloroethane, 20 to 24 mg./l. of perchloroethylene and 28 to 38 mg./l. of asymmetrical tetrachloroethane.

After saturation of the brine with potassium chloride in the salt bin and after performance of the regular purification procedures, the brine to be electrolyzed contains approximately 2 mg./l. dichloroethane, approximately 3 mg./l. perchloroethylene and approximately 3 mg./l. asymmetrical tetrachloroethane.

EXAMPLE 2

Chlorine containing potassium chloride solution of the same composition as in Example 1 is introduced through a glass tube in vertical position; from the bottom, propylene is blown in through a frit in countercurrent. The following results are obtained:

| Throughput of brine in liters per hour | 600 | 600 | 600 | 300 | 150 |
|---|---|---|---|---|---|
| Residence time, in sec | 45 | 45 | 45 | 90 | 180 |
| Addition of propylene in liters per hour | 20 | 15 | 13 | 10 | 8 |
| Chlorine content at the inlet, grams/liter | 0.063 | 0.073 | 0.073 | 0.066 | 0.063 |
| Chlorine content at the outlet, grams/liter | 0 | 0.003 | 0.014 | 0 | 0 |

In the discharged solution, the following chlorinated products are found:

|  | Mg./l. |
|---|---|
| 1,2-dichloropropane | 6–8 |
| 1,3-dichloropropane | 16–20 |
| 1,1,1-trichloropropane | 2 |
| Other trichloropropanes and -propenes | 50–55 |

EXAMPLE 3

In the same experimental arrangement as in Example 2, a 23% sodium chloride solution is treated with ethylene at 70° C.

| | |
|---|---|
| Brine throughput in liters per hour | 300 |
| Residence time in seconds | 90 |
| Ethylene addition in liters per hour | 8 |
| Chlorine content in grams/liter, inlet | 0.055 |
| Chlorine content in grams/liter, outlet | 0 |

EXAMPLE 4

In the same arrangement as in Example 2, the following results are obtained when propane is used:

| Throughput of brine in liters per hour | 600 | 600 | 300 | 300 | 150 |
|---|---|---|---|---|---|
| Residence time, in sec | 45 | 45 | 90 | 90 | 180 |
| Addition of propane in liters per hour | 20 | 40 | 10 | 40 | 8 |
| Chlorine content at the inlet, grams/liter | 0.060 | 0.060 | 0.073 | 0.063 | 0.073 |
| Chlorine content at the outlet, grams/liter | 0.031 | 0.021 | 0.052 | 0.007 | 0.038 |

In the discharged solution, the following chlorination products are found:

|  | Mg./l. |
|---|---|
| 1,2-dichloropropane | 0–3 |
| 1,3-dichloropropane | 6–8 |
| Trichloropropane | 30–54 |

EXAMPLE 5

When acetylene is used, the following results are obtained:

| Throughput of brine in liters per hour | 600 | 300 | 150 |
|---|---|---|---|
| Residence time, in sec | 45 | 90 | 180 |
| Addition of acetylene in liters per hour | 20 | 10 | 8 |
| Chlorine content at the inlet, grams/liter | 0.060 | 0.060 | 0.060 |
| Chlorine content at the outlet, grams/liter | 0.018 | 0.014 | 0.007 |

In the discharge solution, vinyl chloride is found qualitatively.

EXAMPLE 6

Benzene is added dropwise to a 25% potassium chloride solution which contains 0.06 g./l. of chlorine. At a residence time of 90 seconds of the solution in the reaction tube and a quantity of 300 l./hr. potassium chloride solution, 140 ml./hr. of benzene are added. At the discharge, the solution contains still 0.014 g./l. of chlorine. In addition to unreacted chlorine, monochlorobenzene and p-dichlorobenzene are found in the discharged potassium chloride solution.

An embodiment of the process is represented in the drawing which is a schematic flow sheet. A brine solution 14 is electrolyzed in a cell 1 having graphite anodes 2 and mercury cathode 5. Chlorine produced in the cell leaves via line 3, and the sodium amalgam produced is treated in the conventional manner in the vessel 6 to provide hydrogen, caustic, and mercury for recycling to the cell. Depleted brine solution is withdrawn from the cell through line 4 and is contacted with hydrocarbon gas in contacting vessel 7. The gas enters via line 8; any gas escaping from the contacting leaves via line 9, and the treated solution leaves via line 10 which conveys it to brine saturator 11, from which it passes to the purifier 12, and then the solution passes via line 13 back to the cell 1.

The improvement of the invention can be incorporated in the flow sheet, FIG. 41, Ullmann, 3rd ed. vol. 5, page 364, Chloro-alkali-electrolysis, by K. Hass, by replacing the chemical dechlorination (NaHSO$_3$) and compressed air dechlorination of the flow with the treatment of the invention.

What is claimed is:

1. In the electrolysis of alkali metal chloride brine solution employing a mercury cathode to produce chlorine and an alkali metal amalgam, wherein a solution depleted in alkali metal chloride and containing dissolved chlorine is produced, the improvement which comprises removing chlorine from said depleted solution by contacting said depleted solution with a hydrocarbon compound gas or a hydrocarbon compound liquid.

2. Process according to claim 1, wherein prior to treatment with hydrocarbon, the depleted solution is subjected to vacuum treatment to remove a part of the dissolved chlorine.

3. Process according to claim 1, wherein the temperature of said contacting is about 50–100° C.

4. Process according to claim 1, wherein the hydrocarbon is an aliphatic gaseous hydrocarbon.

5. Process according to claim 4, wherein the hydrocarbon is unsaturated.

6. Process according to claim 5, wherein the contacting time is less than about 2 minutes.

7. Process according to claim 1, said depleted solution containing mercury salt, the removal of chlorine being limited so that mercurous chloride is not formed and evolved from the solution.

8. Process according to claim 1, wherein the alkali metal chloride is potassium chloride.

9. Process according to claim 1, wherein during said contacting chlorinated hydrocarbons are formed and the depleted solution following said contacting contains in excess of about 10 mg. per liter of chlorinated hydrocarbon, and following said contacting, alkali metal chloride is added to the depleted solution to form brine solution and the brine solution is recycled to the electrolysis, treating the solution following said contacting and before recycling to reduce the content of chlorinated hydrocarbon to less than about 10 mg. per liter.

References Cited

UNITED STATES PATENTS

| 3,051,637 | 8/1962 | Judice et al. | 204—98 |
| 3,052,612 | 9/1962 | Henegar et al. | 204—128 |

HOWARD S. WILLIAMS, Primary Examiner.

H. M. FLOURNOY, Assistant Examiner.

U.S. Cl. X.R.

204—99; 260—694